UNITED STATES PATENT OFFICE.

ALFRED H. ANNAN, OF DALLAS, TEXAS, ASSIGNOR TO THE THERMOWAX CO., OF DALLAS, TEXAS, A CORPORATION OF TEXAS.

COMPOSITION OF MATTER FOR TREATING CONCRETE FLOORING.

1,333,057. Specification of Letters Patent. Patented Mar. 9, 1920.

No Drawing. Original application filed May 12, 1917, Serial No. 168,210. Divided and this application filed May 2, 1918. Serial No. 232,045.

*To all whom it may concern:*

Be it known that I, ALFRED H. ANNAN, a citizen of the United States, residing at Dallas, in the county of Dallas and State of Texas, have invented certain new and useful Improvements in Compositions of Matter for Treating Concrete Flooring, of which the following is a specification.

My invention has relation to a composition of matter for use in the treatment of concrete, cement, artificial stone or similar floors made from granular and porous materials whether factitious or natural.

In an application for patent filed by me under date of May 12, 1917 and Serial No. 168,210 of which application this present application for patent is a division, I have described and claimed the process whereby such floors may be treated to secure a dustless, waxy surface for the floor. In this my present application for patent I desire to describe and claim a composition of matter which is peculiarly adapted for use with such process or analogous processes.

It is the main object of my present invention to secure by surface treatment of already laid and formed floors of concrete, cement, stone (either artificial or natural) a dustless, waxy, surface for the floor, by the use of a composition of matter which by entering the pores or voids of the material of which the floor is composed is practically everlasting and prevents disintegration of the materials of which the floor is formed.

In the carrying out of my invention there is provided a new composition of matter resulting from combining mineral, vegetable and animal waxes with or without coloring matter such as soluble oil dyes or stains or chromic oxid, and there is also provided a new process of applying said matter to the surface of the floor.

My new composition of matter which forms the subject matter of this application for patent consists of the following materials in about the proportions, by weight, as stated.

Mineral wax (refined paraffin) _____ 70 lbs.
Animal wax (bees' wax) ___ 20 lbs.
Vegetable wax (carnauba or palm wax) _____ 10 lbs.

to which may be added

Coloring matter (pigments or soluble oil dyes or stains) _____ 8 lbs.

This composition of matter is for use in rough work, for factory finish or one coat work. Where two coat work is desirable, a priming coat and a finish coat each requires a composition of matter differing slightly in proportions only, thus the priming coat is formed as follows:

Mineral wax (paraffin) ____ 80 lbs.
Animal wax (bees' wax) ___ 15 lbs.
Vegetable wax (carnauba) _ 5 lbs.
Coloring matter, if required _ 4 lbs.

The finish coat consists of—

Mineral wax _____ 60 lbs.
Animal wax _____ 15 lbs.
Vegetable wax _____ 15 lbs.
Coloring matter, if required _ 12 lbs.

The composition of matter is secured by substantially the following method: The three waxes are melted and if a colored surface is desired the coloring matter is preferably added after which the liquid is poured into pans and allowed to cool to normal atmospheric temperatures when it will be found to be a relatively hard, waxy compound. In the case of the finish coat the waxy materials are put together in their liquid state and heated. The coloring matter, if required, is then added and the composition thus formed is permitted to cool at normal temperature.

When the floor is to be treated, the surface of the floor, whether plain or stained or colored, is heated until it reaches a temperature of approximately 300 degrees Fahr. This insures the heating of the floor to a proper depth, usually a half inch, to a temperature sufficient to permit the composition of matter when melted at about a temperature of 212 degrees Fahr., to enter the pores of the stony material of which the floor is composed to a depth of approximately half inch. The melted composition of matter may be applied to the heated surface of the floor with a brush or other suitable instrument or tool and when the floor cools to normal temperatures the waxy composition is thoroughly embedded and incorporated with the porous flooring and becomes in fact part and parcel of the wearing surface of the floor. Among the coloring material which I have found to be useful in imparting color to the filler or to the floor chromic oxids or soluble oil dyes are preferred.

Having thus described the nature and objects of my invention, what I claim as new and desire to secure by Letters Patent, is—

1. A composition of matter for coating floors of a stony, porous, granular nature which consists of mineral wax 70 lbs. animal wax 20 lbs. vegetable wax 10 lbs. and 8 lbs. of coloring matter added to the waxes when said waxes are melted.

2. A composition of matter for coating floors of stony, porous, granular nature which consists of paraffin 70 lbs., beeswax 20 lbs., and carnauba 10 lbs. combined in the proportions stated.

3. A composition of matter for treating floors of stony, porous, granular nature which consists of paraffin 70 lbs., beeswax 20 lbs., and carnauba 10 lbs., combined in the proportions stated, with 8 lbs. of coloring oxid.

In testimony whereof I have signed my name to this specification.

ALFRED H. ANNAN.